(12) United States Patent
Bond et al.

(10) Patent No.: US 11,788,872 B2
(45) Date of Patent: Oct. 17, 2023

(54) METHOD AND SYSTEM FOR DETERMINATION OF LIQUID VOLUMES

(71) Applicant: Liquid Controls LLC, Lake Bluff, IL (US)

(72) Inventors: Douglas E. Bond, Hawthorn Woods, IL (US); Bryan Haynes, Anacortes, WA (US); Dan Clevenger, Stokesdale, NC (US); Jeff Hageman, Lindenhurst, IL (US)

(73) Assignee: Liquid Controls LLC, Lake Bluff, IL (US)

( * ) Notice: Subject to any disclaimer, the term of this patent is extended or adjusted under 35 U.S.C. 154(b) by 105 days.

(21) Appl. No.: 17/232,592

(22) Filed: Apr. 16, 2021

(65) Prior Publication Data

US 2021/0325215 A1  Oct. 21, 2021

Related U.S. Application Data

(60) Provisional application No. 63/010,720, filed on Apr. 16, 2020.

(51) Int. Cl.
*G01F 23/292*  (2006.01)
*G01F 23/80*  (2022.01)
*G01F 1/10*  (2006.01)
*G01F 1/00*  (2022.01)

(52) U.S. Cl.
CPC ............ *G01F 1/007* (2013.01); *G01F 23/292* (2013.01); *G01F 23/804* (2022.01); *G01F 1/10* (2013.01)

(58) Field of Classification Search
None
See application file for complete search history.

(56) References Cited

U.S. PATENT DOCUMENTS

| 5,665,895 A | 9/1997 | Hart et al. |
| 8,195,590 B1 | 6/2012 | Coggins et al. |
| 2018/0037451 A1* | 2/2018 | Johnson ................. G01F 22/00 |

OTHER PUBLICATIONS

The International Search Report and The Written Opinion of the International Searching Authority from the related PCT Application No. PCT/US2021/027661, dated Jul. 21, 2021, 13 pages.

* cited by examiner

*Primary Examiner* — Paul M. West
*Assistant Examiner* — Mark A Shabman
(74) *Attorney, Agent, or Firm* — TUCKER ELLIS LLP; Michael G. Craig; Heather M. Barnes

(57) ABSTRACT

One or more techniques and/or systems are disclosed for accurately determining the volume of liquid in a container, such as after or prior to a fluid transfer into/from the container. The volume of liquid flowing through a flow meter can be measured at multiple data intervals by a flow meter. Further, the height of a liquid inside the container can be measured by a liquid level sensor at the multiple data intervals. A register can receive data indicative of the respective measurements, and the volume of liquid in the container can be determined based on the relationship between data indicative of the measurement of the volume of liquid flowing through a flow meter at the multiple data intervals and the measurement of the height of a liquid inside the container at the multiple data intervals.

20 Claims, 11 Drawing Sheets

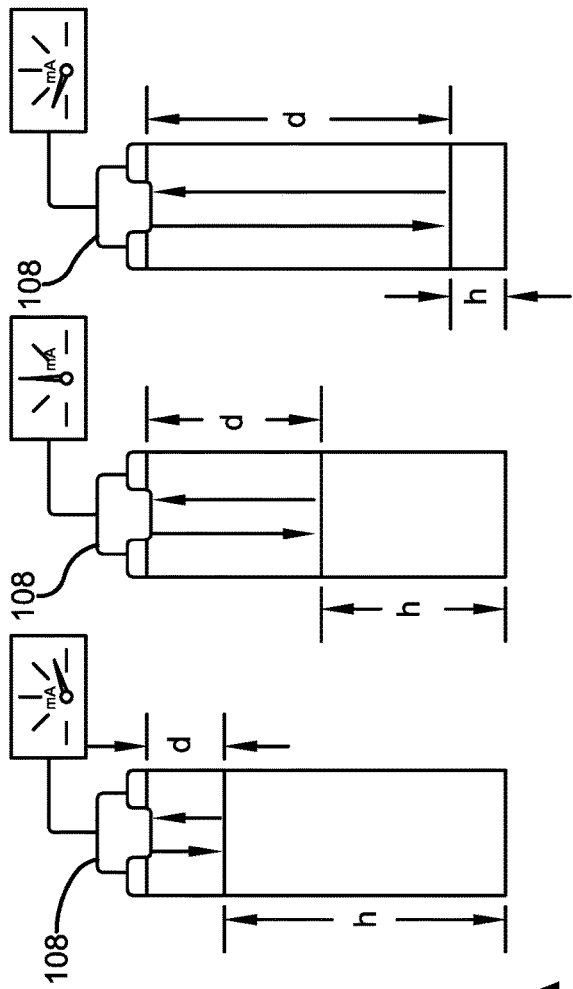 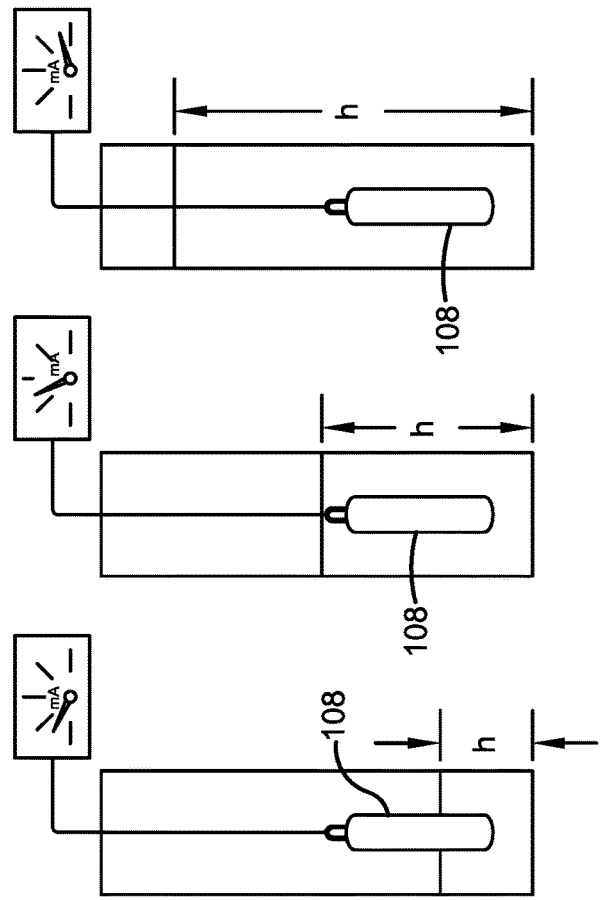
FIGURE 5A  FIGURE 5B

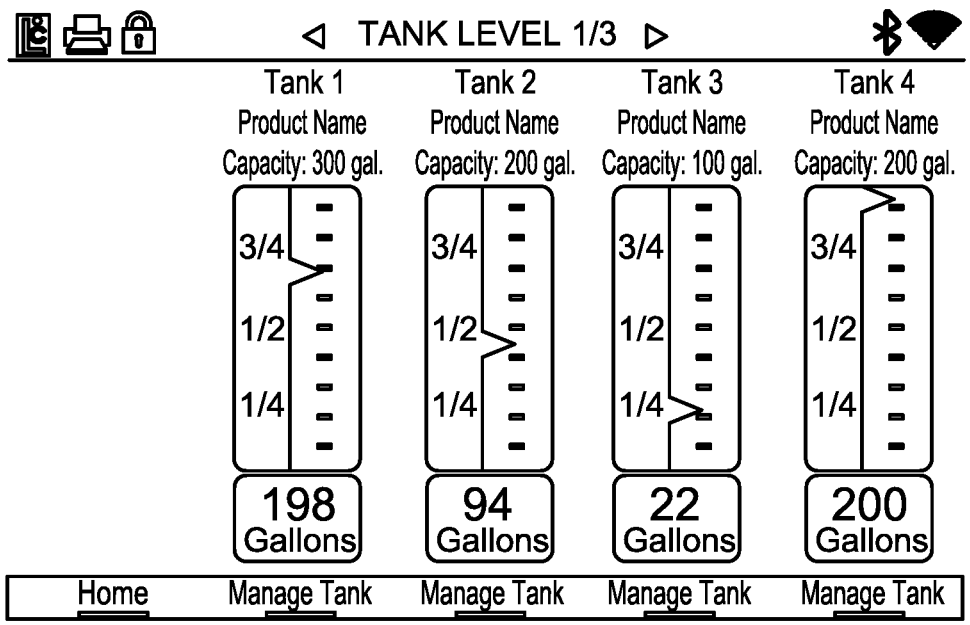
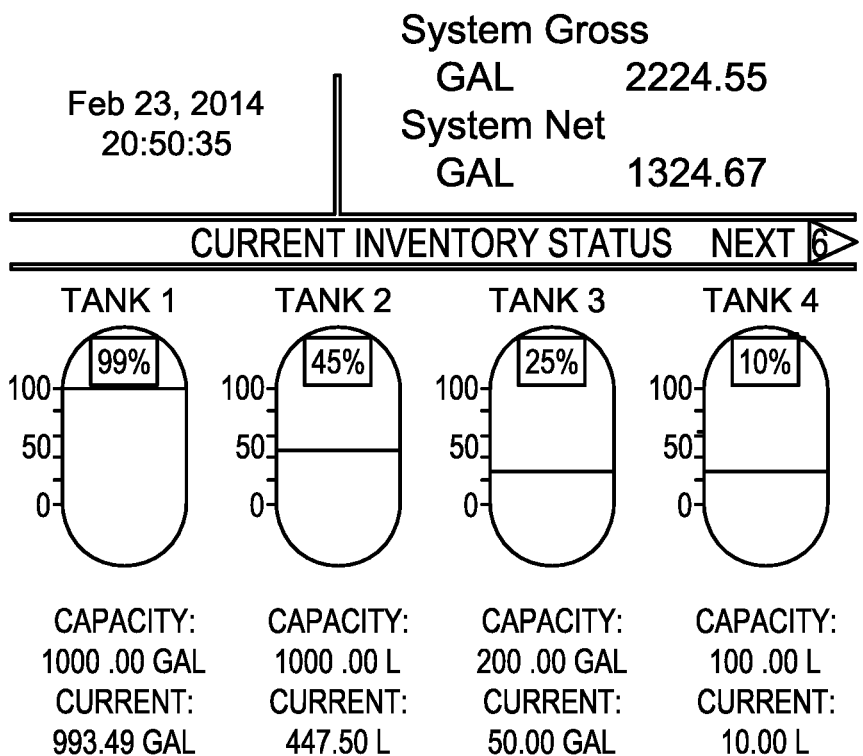
FIGURE 10

US 11,788,872 B2

METHOD AND SYSTEM FOR DETERMINATION OF LIQUID VOLUMES

CROSS-REFERENCE TO RELATED APPLICATIONS

This application claims priority to U.S. Provisional Patent Application Ser. No. 63/010,720, entitled METHOD AND APPARATUS FOR AUTOMATIC CALIBRATION OF LIQUID CONTAINER PROFILES AND DETERMINATION OF LIQUID VOLUMES, filed Apr. 16, 2020, which is incorporated herein by reference.

BACKGROUND

When storing, transporting, or delivering liquid products such as fuels (e.g., gasoline, diesel, LPG, aviation fuel, etc.), and other liquids, it is common for the owner and operator having possession of the product before it is sold or transferred to have knowledge of the volume (or quantity by weight) of the liquid product remaining in the container. This provides the owner/operator with knowledge to plan and execute their deliveries and/or sale of the product efficiently, plan replenishment appropriately, and improve overall visibility of the liquid product inventory across a truck unit or fleet of containers or trucks. Today, there are varieties of commercially available sensors installed in container systems that can either provide linear measurement of the depth of a liquid in a container or distance to the surface of a liquid in the container from a known fixed height above the surface. Further, some commercially available sensors provide an output device (computer, display, PLC, printer, etc.) that can provide calculations based on known linear measurements of the containers containing liquid product being measured.

A significant challenge to determining liquid volume in containers is that containers are rarely uniform vertically. Containers are not always uniform and may have dimensions that change non-linearly, non-uniformly, and non-symmetrically. Therefore, it is difficult to provide accurate, easily calculable correlations between measured liquid height and volume of liquid remaining in truck containers.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more systems and methods are described herein to utilize data from registers, meters, and liquid level sensors to accurately determine an amount of fluid remaining in a storage container. For example, a register and a fluid meter can determine fluid transferred from a container, and a liquid level sensor can provide data to the register that is indicative of a distance between the sensor and the liquid surface (interface) inside the container. In this example, using these measurements, the register can identify the amount of fluid remaining in the container, such as after a transfer event.

In one implementation, there is a method for determining the volume of liquid in a container. The method comprises measuring a volume of liquid flowing through a flow meter at a plurality of data intervals and measuring the height of a liquid inside the container at a plurality of data intervals. Further, the method can comprise calculating the volume of liquid remaining in the container based on the relationship between data from the measuring a volume of liquid flowing through a flow meter at various data intervals and the measuring the height of a liquid inside the container at various data intervals.

In another implementation, there is a liquid level system for determining the volume of liquid in a container. The liquid measurement system comprises a flow meter configured to measure a volume of liquid flowing into or out of the container at multiple data intervals; a liquid level sensor configured to measure a height of a liquid in the container at the multiple data intervals; and a register in communication with the flow meter and the liquid level sensor. The register can be configured to collect data from the flow meter and liquid level sensor to calculate the volume of liquid in a container based on the relationship between the measured volume of liquid flowing into or out of the container and the measured height of a liquid in the container.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein:

FIG. 5A is a component diagram illustrating a liquid level sensor measuring the level of liquid in a container using radar detection or ultrasonic detection.

FIG. 5B is a component diagram illustrating a liquid level sensor measuring the level of liquid in a container using a mechanical float switch.

FIG. 10 is component diagram illustrating one example of a visual display of data on an external device.

DETAILED DESCRIPTION

Figure 1:
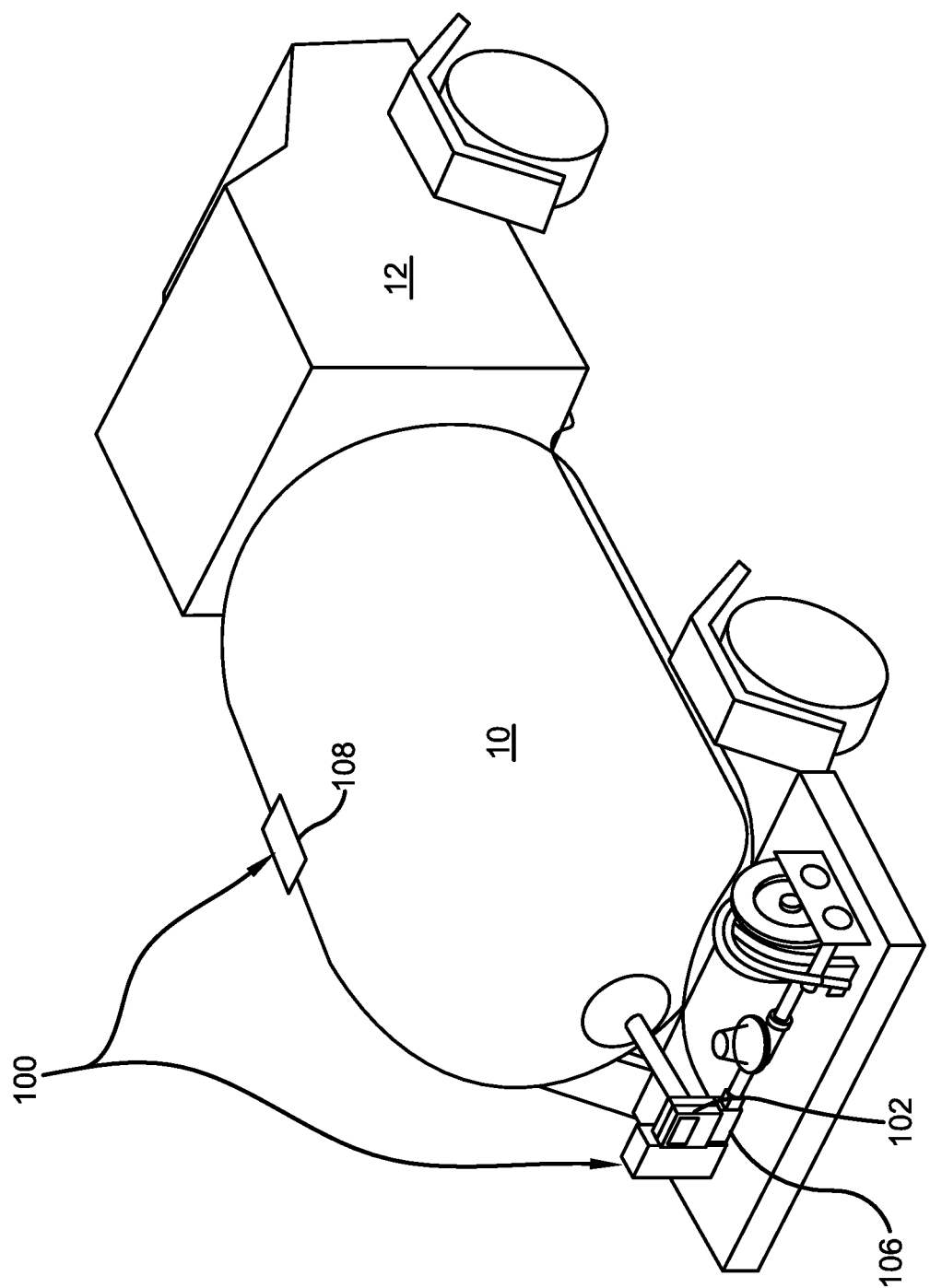
FIG. 1 is a component diagram illustrating a perspective view of one example implementation of an integrated liquid measurement system according to this disclosure with the liquid measurement system attached to the container of a fuel delivery truck.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

A type of linear height measurement (height=h) of a tank when combined with a fixed width measurement (width=w) or the tank, or fixed length measurement (length=l) of the tank can provide a calculable volume (volume=v) for proportionally designed containers such as cubes, rectangular cubes, vertical cylinders, or other fixed geometric shapes. For example (volume of a cube or rectangular cube: v=lwh; volume of a cylinder: v=$\pi r^2$h; volume of a cone: v=$\pi r^2$h/3; volume of a pyramid: v=lwh/3).

However, whether by design or the dynamics of the relationship between the container and the product being held, many containers do not have an easily or consistently calculable volume using only a height (h) measurement because the length (l) and/or width (w) vary on an inconsistent, complex, or incalculable basis as height (h) changes. In these cases, a strapping chart can be made available that provides either the Δl:Δw:Δh relationship across a sampling of points across the full height (h) range of the container, or an h:v relationship where, at a certain height (h), there is expected to be an approximate volume (v). This data is entered into a secondary device configured to calculate and output a volume (v) using measured height (h) at a known length (l) and width (w) or return an approximate volume (v) based on a measured height (h) with a known height-to-volume (h:v) relationship. This process is referred to as the manual strapping chart method. That is, for example, the strapping chart correlates the liquid height in the container to the volume of liquid in the container at that height.

Another method to calculate liquid level in a container is the linear measurement method. The linear measurement method provides a very rough approximation of remaining volume in containers, which may be more accurate when the container has a uniform shape from bottom to top (e.g., square or rectangle); however it is less accurate where the length (l); width (w); height (h) ratio is not fixed throughout the height (h) of the container, such as in a horizontal cylinder with domed ends. In the linear measurement method, a liquid level sensor or gauge may be used to measure liquid levels in the container. The measured depth of liquid in the container is compared to the total available depth of the same container and reported in a measured height (mh)/total height (th) percentage approximation (i.e., 10% full) or an approximated fraction scale (i.e. F, ¾, ½, ¼, E).

Another method of calculating volume in a container is the manually-inferred inventory method. The manually-inferred inventory method does not utilize a liquid level sensor to measure the liquid level in a container. Instead, this method utilizes a known starting volume (v1) of liquid in a container and a means to measure any liquid added or removed from the container, such as using a fluid flow meter. A person or device can infer total volume of liquid in the container by summing the measured additions (v2) and/or subtractions (−v3) of liquid to the known starting volume (v1) of liquid in the container.

Figure 2A:
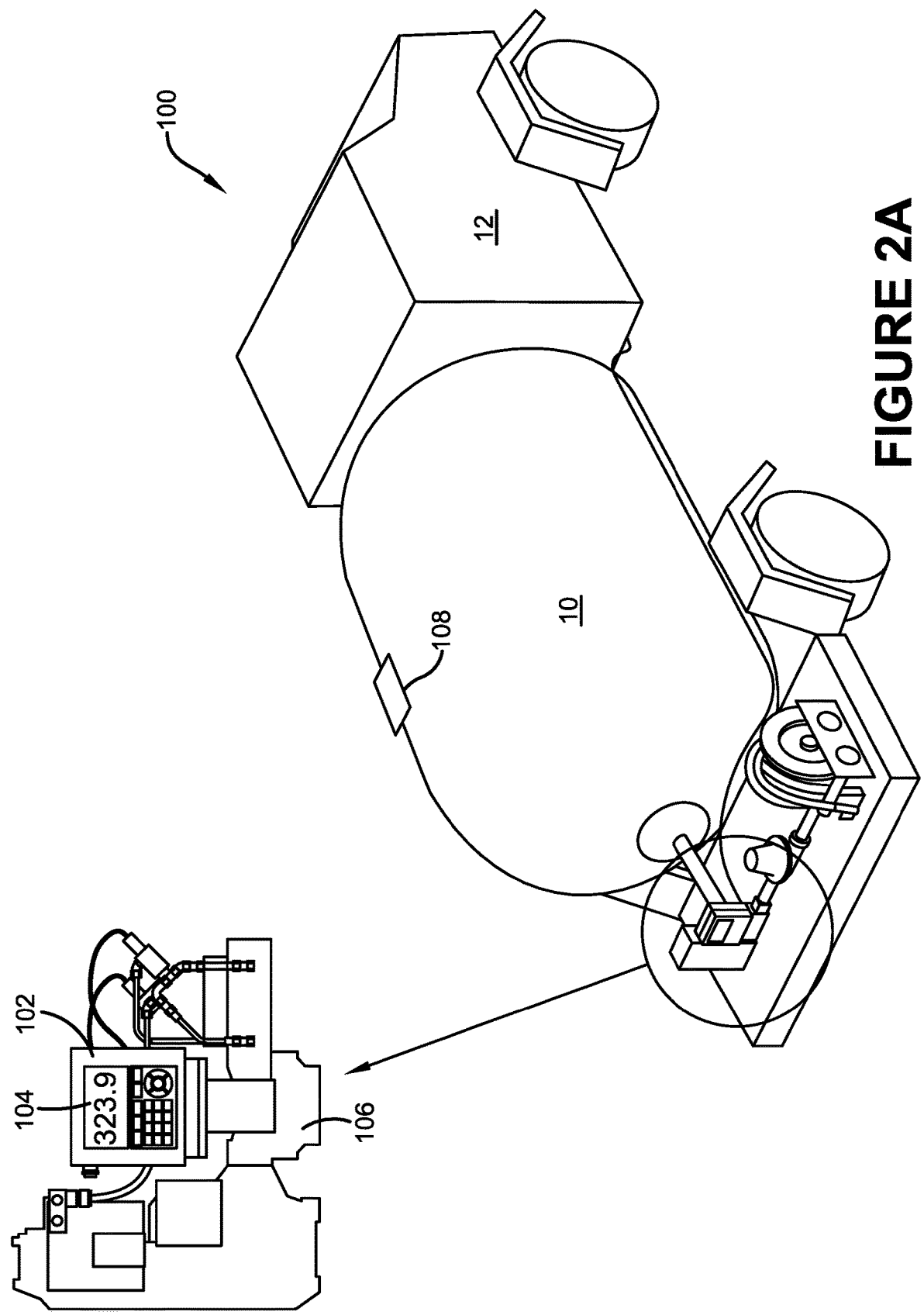
FIG. 2A is a component diagram illustrating another view of the integrated liquid measurement system.
Figure 2B:
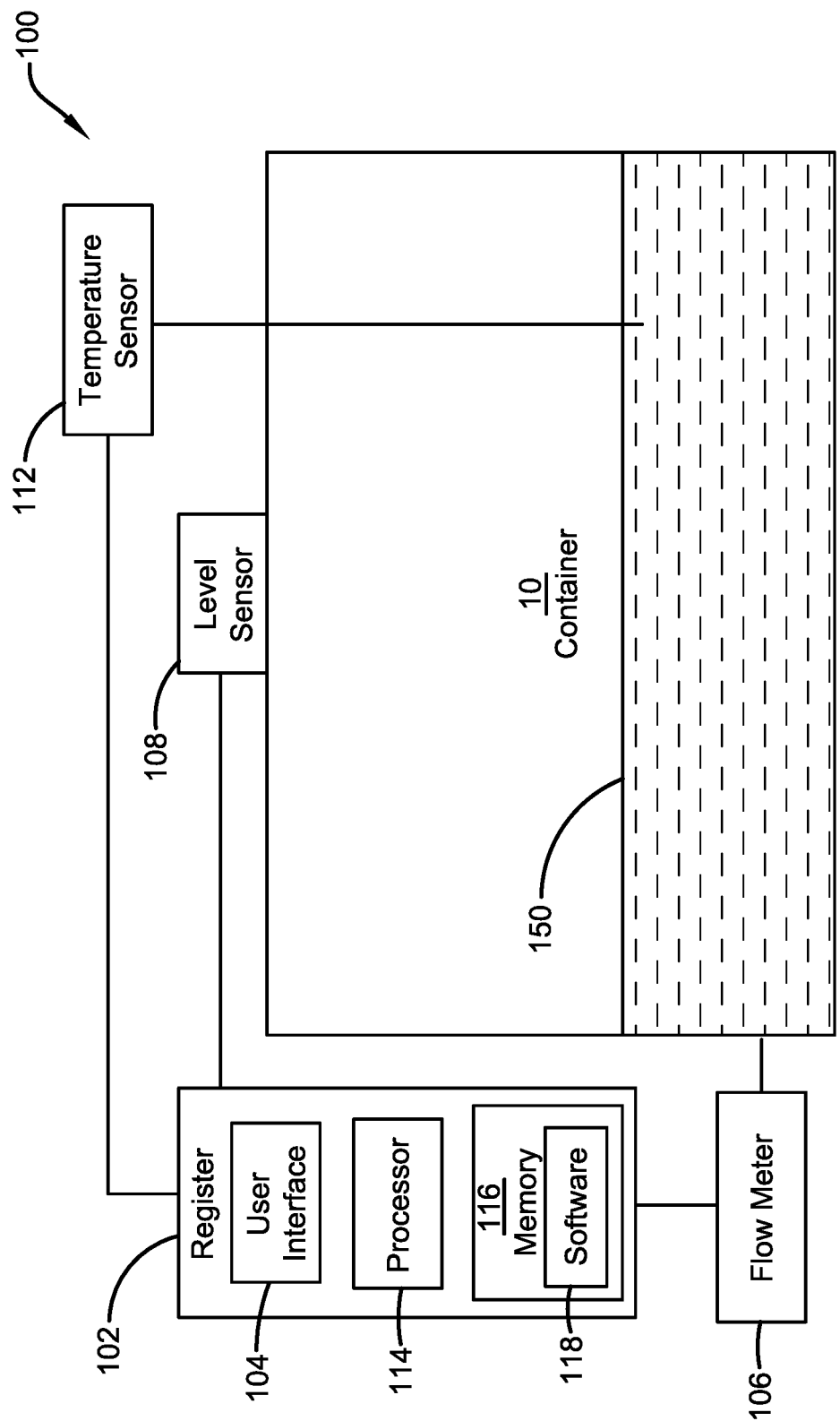
FIG. 2B is a schematic diagram illustrating one exemplary implementation of an integrated liquid measurement system.
Figure 3:
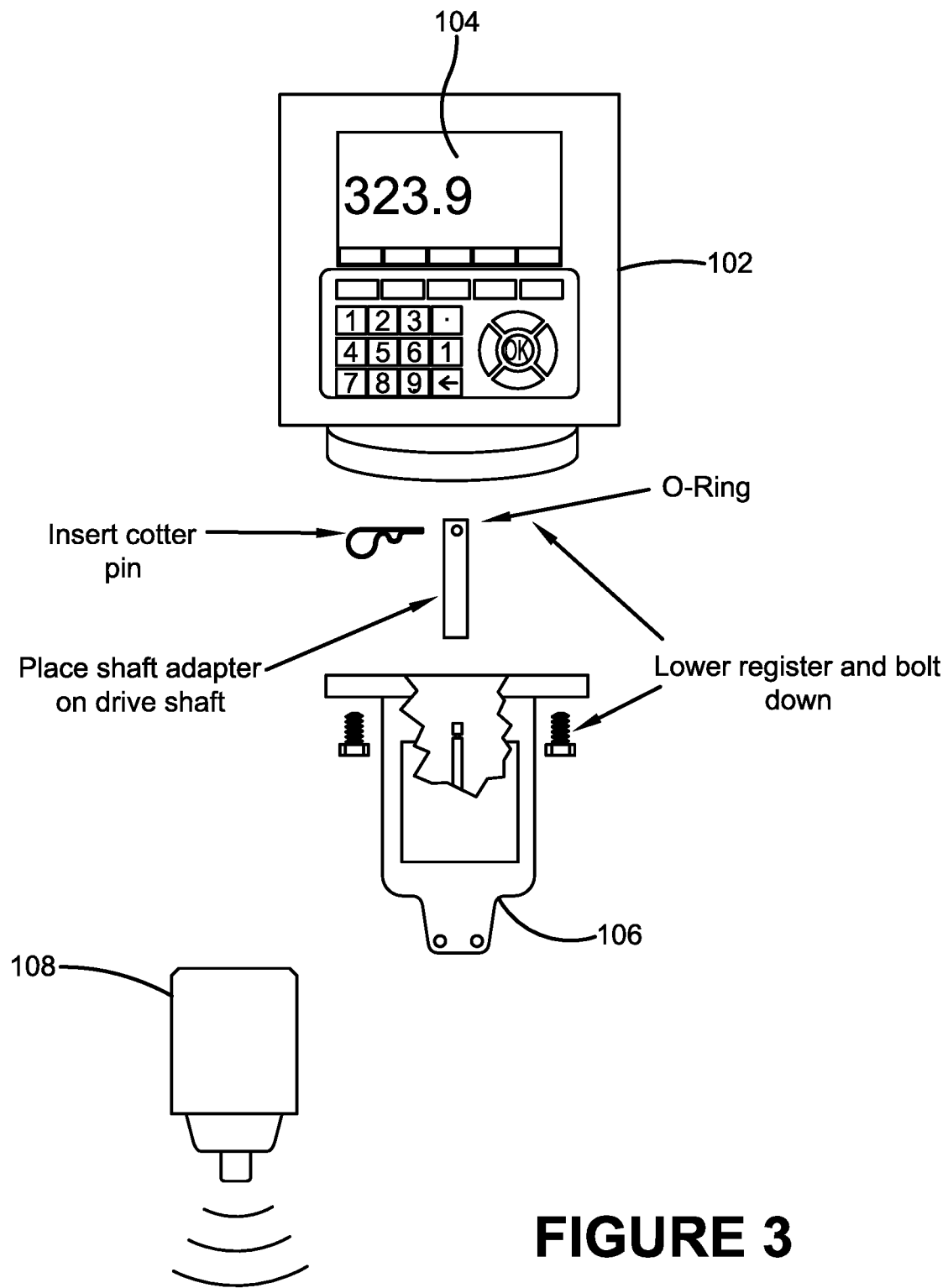
FIG. 3 is a component diagram illustrating independent components of a non-integrated liquid measurement system.

Alternate techniques and systems for determining an amount of liquid in a container are provided herein. Referring now to FIGS. 1 through 3, there is illustrated an exemplary embodiment of a liquid measurement system 100 configured to determine a volume of liquid in a container 10. FIGS. 1 and 2 depict the liquid measurement system 100 engaged with the surface of a container 10 of a fuel truck 12. The container 10 is configured to hold liquid products (e.g., fuels in the form of gasoline, diesel, LPG, and aviation fuel) inside the container 10 so the liquid products can be transported and delivered elsewhere. The container 10 may be a variety of shapes and sizes typically utilized in the industry.

The liquid measurement system 100 may comprise a register 102, at least one fluid flow meter 106, and at least one liquid level sensor 108. Optionally, the liquid measurement system 100 may also include a temperature sensor 112. As shown in FIGS. 1 and 2, in some embodiments the liquid measurement system 100 is an integrated unit. As depicted in FIG. 3, in other embodiments the liquid measurement system 100 comprises a register 102, at least one fluid flow meter 106, and the at least one liquid level sensor 108 as separate components which are electrically, physically, or otherwise communicatively coupled (e.g., wired or wirelessly). In some implementations, the fluid flow meter can comprise a mass flow meter, such as a Coriolis mas flow meter. For example, the Coriolis mass flow meter applies the Coriolis effect to calculate mass flow by measuring a phase shift between sensors along flow tubes, which allows for determination of the amount (e.g., mass, density, volume) of fluid flowing through the tubes. In some implementations, the flow meter can comprise a positive displacement meter that provides for volumetric measurement of the fluid flowing through the meter. In other implementations, the flow meter can comprise a turbine meter that can provide for volumetric measurement of fluids flowing through the meter. It should be appreciated that any appropriate flow meter can be used, where at least one of the resulting measurements allows for identification of a volume of fluid transferred. That is, for example, a direct volume measurement provides for the transferred volume, and a measurement of mass and density of the fluid may also provide for a volumetric measurement.

The liquid measurement system 100 can comprise at least one liquid level sensor 108 mounted on the container 10. In some implementations, the liquid level sensor 108 is coupled at the top of the container 10 to measure the height (h) of the liquid level inside the container 10. The liquid level sensor 108 can also monitor a change in the height (Δh) of the liquid level in the container 10, such as due to the transfer of liquid into and out of the container 10. In some implementations, the liquid level sensor 108 can transmit data indicative of a height (h) of the liquid level in the container 10 (e.g., sensed or otherwise calculated), to the register 102 of the liquid measurement system 100 (e.g., via an electronic or wireless signal). In some embodiments, the liquid level sensor 108 may utilize 4-20 mA sensor inputs. In some embodiments, the liquid level sensor 108 is integrated into the liquid measurement sensor 100 unit. The liquid level sensor 108 and the register 102 may communicate through a direct electrical connection, such as cable or wire, or wirelessly, such as through Bluetooth and Wi-Fi or other wireless platforms.

A variety of liquid level sensors may be used to measure or calculate the height (h) of the liquid level in the container 10. For example, in the embodiment shown in FIG. 5B the liquid level sensor 108 comprises a float gauge device (e.g., mechanical, and/or electronic float) that provides a measured height (h) of the liquid in the container 10. In other implementations, the liquid level sensor may utilize ultrasonic detection (e.g., sonar or radar), light detection (e.g., laser), or other forms of non-mechanical sensing to identify a distance between the sensor and the top of the liquid in the container. In other implementations, the liquid level sensor may utilize a force gauge or other weight detection devices to determine a weight of the remaining product in the container.

Figure 4:
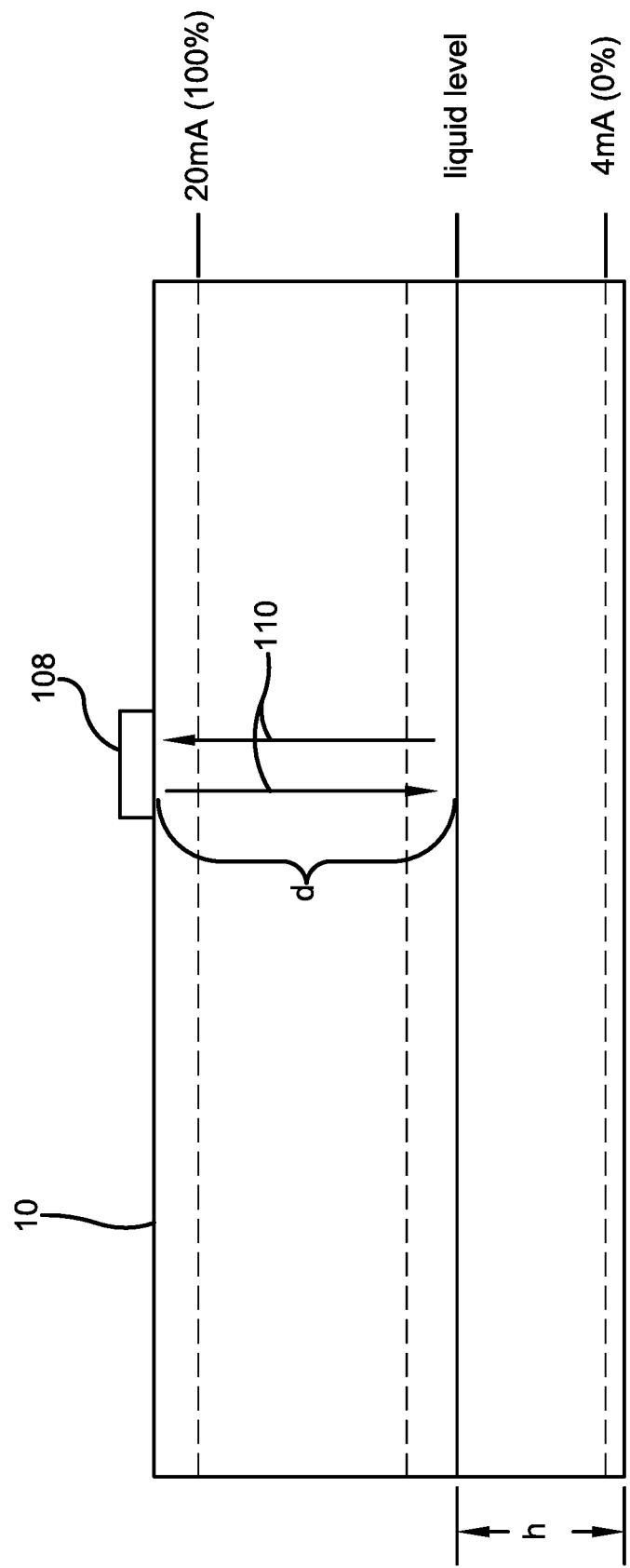
FIG. 4 is a component diagram illustrating a cross section view of one implementation of a container with a sensor attached to the top of the container to measure the height of the liquid inside the container.
Figure 6:
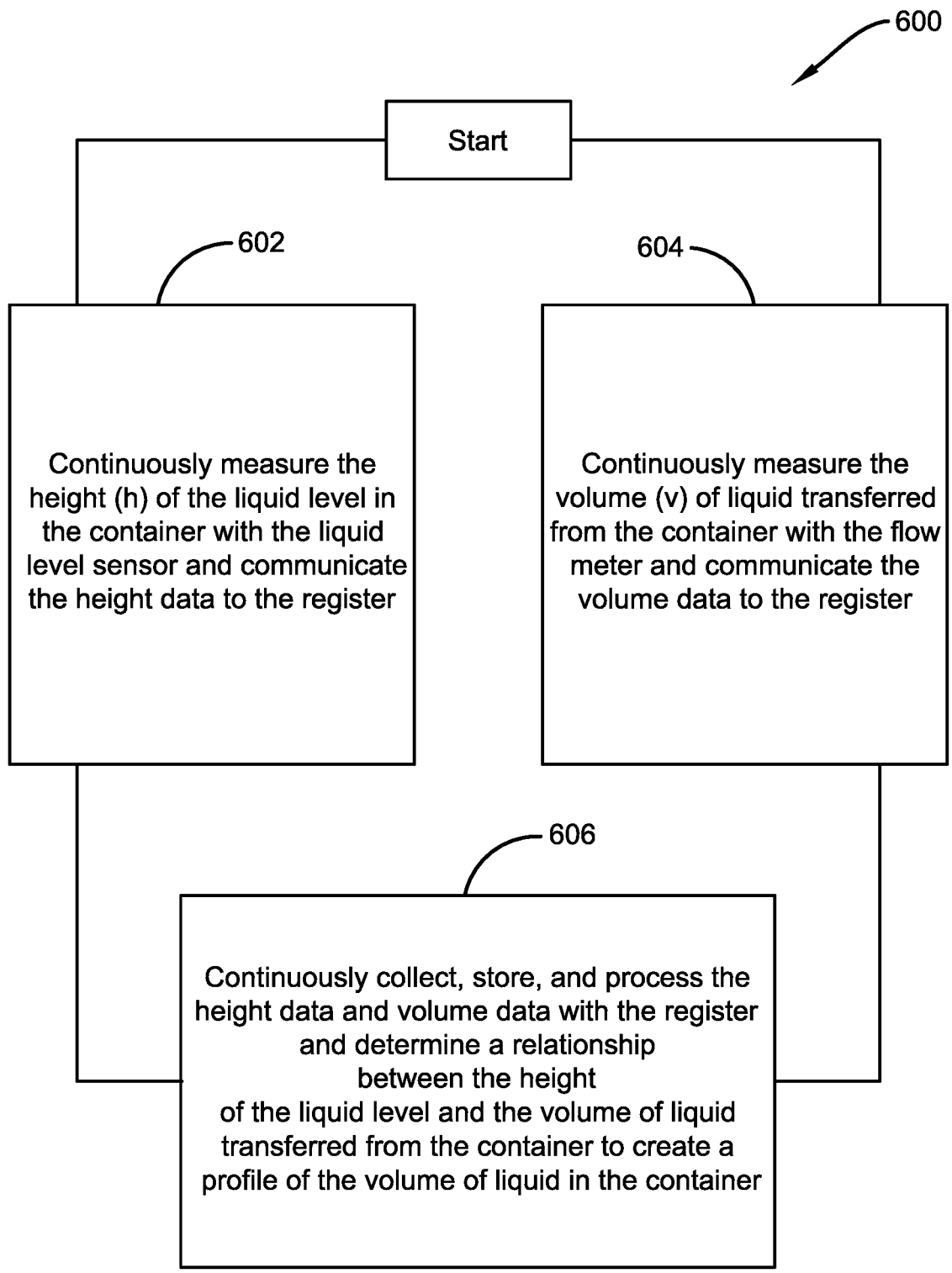
FIG. 6 is a flow diagram illustrating a method of creating a profile of the volume of liquid in a container based on height and volume measurements using the liquid measurement system of FIG. 1.

In the embodiments depicted in FIGS. 3, 4, and 5A, the liquid level sensor 108 comprises an ultrasonic sensor or radar sensor that determines the distance (d) of the liquid level relative to the fixed location of the liquid level sensor 108 above the liquid surface. From the distance (d), the height (h) of the liquid level in the container is determined. Utilizing either the ultrasonic sensing device or radar sensing device, the liquid level sensor 108 can be mounted proximate the top of the container 10, such as above the liquid level to be measured. As an example, this type of liquid level sensor 108 may be disposed so that it does not contact the liquid to provide for a desired accuracy of measurement of the height (h) of the liquid level.

In these implementations, when measuring the height of the liquid, the ultrasonic transmitter emits ultrasonic impulses 110 (e.g., short) directed toward the surface of the liquid 150, as shown in FIG. 5A. In some implementations, the ultrasonic sensor can identify the time between the sound wave emission from the transmitter to the reception of the reflection off the surface of the liquid 150, by the ultrasonic sensor. That is, for example, the ultrasonic sensor measures the time delay between the transmitted and received signals using an on-board microprocessor and/or the liquid measurement system 100 (e.g., the register 102), and calculates the distance (d) to the surface of the liquid 150. Using the height of the container and the distance (d), the height (h) of the liquid level in the container 10 can be determined.

In some implementations, the liquid level sensor 108 can comprise a radar sensing device that operates in a similar fashion as the ultrasonic sensing device. As an example, the radar sensor transmitter can send a low energy pulse of microwaves 110 towards the surface of the liquid 150, as shown in FIG. 5A. In this example, at the point of the liquid level (liquid interface), a significant proportion of the microwave waves are reflected back to the transmitter. In this example, the transmitter can measure the time interval between the transmitted and received signals, and an on-board processor and/or the liquid measurement system 100 (e.g., the register 102) can determine the distance (d) to the surface of the liquid 150. In this way, for example, using the height of the container 10 and the distance (d), the height (h) of the liquid level in the container 10 can be determined. In other embodiments, the liquid level sensor 108 may comprise another device (e.g., a pressure sensor, laser detector, etc.) that provides a calculated or measured signal proportional to the height (h) of the liquid level in the container 10.

In some implementations, the liquid measurement system 100 can comprise at least one temperature sensor 112. As an example, the temperature sensor 112 can detect a temperature inside the container 10 and communicate data indicative of the sensed temperature to the register 102, either through a direct electrical connection, such as wire or cable, or wirelessly. In some implementations, the temperature sensor 112 may be integrated into the liquid measurement system 100. In other implementations, the temperature sensor can comprise a separate unit communicatively coupled with the register 102, and operatively engaged with the liquid in the container (e.g., inside or outside of the container 10).

As illustrated in FIGS. 1 through 3, the liquid measurement system includes at least one flow meter 106 that provides a volumetric measurement of fluid flow during transfer. The flow meter 106 can measure (e.g., or at least provide) the volume and/or rate of flow of liquid (v) (e.g., and/or mass and density) flowing through the flow meter 106 as liquid is transferred into and out of the container 10. The flow meter 106 is communicatively coupled with the register 102 to provide the volume of liquid (v) added to the container 10 and the volume of liquid (v) removed from the container 10. In some implementations, the flow meter 106 may be integrated with the register 102, or may be otherwise communicatively coupled with the register 102. For example, the flow meter 106 and the register 102 may communicate using a direct electrical connection, such as cable or wire, or wirelessly, such as through Bluetooth and Wi-Fi.

As illustrated in FIGS. 1 through 3, the liquid measurement system 100 comprises a register 102. The register 102 can calculate, monitor, and record fluid transfer data (v) (e.g., volumetric data) from the at least one fluid flow meter 106. In some implementations, the register 102 may also calculate, monitor, and record data from the other system sensors (e.g., level sensor 108, temperature sensor 112), such as the height (h) of the liquid level, as determined by the at least one liquid level sensor 108, and the temperature in the container 10, as determined by the temperature sensor 112, and other inputs. As an example, the register 102 may comprise a processor 114, a storage medium such as memory 116, and programmable software 118 disposed thereon. In some implementations, the software 118 may comprise algorithms to perform data collection, perform liquid volume calculations, and control data flow into and out of the register 102. In some implementations, the register 102 may also provide liquid transfer process customization and automation as well as bridge data communication between the operator, equipment, and corporate. Additionally, the register 102 may include a user interface 104 such as a human machine interface (HMI) to display liquid measurement, system 100 information, liquid volumes, customizations, settings, and other desired system controls and information.

As an example, the register 102 may be a type, such as the LCR.iQ by Liquid Controls. The LCR.iQ is configured to perform the following functions: weighs & measures custody transfer (e.g., product delivery and ticket generation); collects metrological data; offers preset deliveries by volume; multiple product selection; multi-point meter calibration; security settings; air and vapor elimination (e.g., using appropriate accessories); single and dual stage valve control (e.g., using appropriate accessories); and electronic temperature volume compensation (ETVC).

Several alternative methods may be considered to determine the volume of liquid in a container 10 having a shape (length (l) and width (w)) that is non-uniform along the height of the container 10.

In some implementations, a technique can be used that incorporates a manual strapping method. The manual strapping method entails manually using identified changing volumetric measurements of the container 10 from the bottom to the top (e.g., where the dimensions change from bottom to top). In this example implementation, a register 102 of the liquid measurement system 100 receives a measure level signal from a liquid level sensor 108, and the user manually determines the volume based on the known dimensions. For example, the register 102 may receive a liquid level reading from the liquid level sensor 108 and provide a report to the user, who then uses the manual measurements to identify the volume. As an example, this method may be complicated and cost prohibitive as the user may need to utilize a sophisticated system including a liquid level sensor 108, a controller, and output device that is approximately three to five times the cost of a conventional sensor. As a result, this method is not always a commercially viable solution.

An alternate method provides a means for a user to manually enter strapping chart data for a particular container 10 into the register 102 of the liquid measurement system 100. In this method, the register 102 would receive the height (h) of the liquid level from a liquid level sensor 108 and the register 102 would reference the entered strapping chart data using the measured height (h) of the liquid from the liquid level sensor 108 to calculate the volume of liquid remaining in the container 10.

However, this method introduces both operational complexity in manually entering up to 100 points of data into the register 102, and a risk of potential human error in manual data entry that could affect the level of reporting accuracy for as long as the register 102 is in service. Other factors that influence the accuracy that cannot be addressed with this method result from the dynamics of temperature change on container dimensions and container "squatting" or "sag" that results in changing the container internal shape when bearing varying weights associated with the varying volumes of liquid within the container.

Another alternate method is the linear measurement method. Due to the high level of inaccuracy of this method, this method is not considered a commercially viable solution.

Another alternate method is application of the manually-inferred inventory method by the register 102 in the liquid measurement system 100. This manually-inferred inventory method has the user input a known starting volume in a given container 10 as well as known additions to an existing inferred volume in the given container 10. As the system 100 delivers liquid from the container 10, the flow meter 106 monitors the volume (v) of liquid expelled and the register 102 performs calculations, such as subtracting a highly accurate measured liquid volume from the last known manually entered or inferred liquid volume.

As an example, while this method does not utilize a liquid level sensor 108, it has vulnerability in its dependency on HMI input from a person or external device to manually enter a starting liquid volume in the container 10. Subsequently, the volume of liquid removed from the container 10 can be subtracted from the starting volume of liquid in the container 10. The accuracy of this method depends of the user's entering of an accurate starting volume data since the calibrated flow meter 106 can provide measured volumes of liquid removed from the container 10. However, accuracy depends on the proper identification of the container volume, and starting volume or adjusted volumes to be entered by a human user and are potentially subject to inaccurate inventory reporting if the manual inputs are not accurate. However, inaccuracies may be encountered with unusually-shaped vessels, or vessels that at damages, out of shape, or otherwise affected by temperature and pressure changes.

Referring now to FIGS. 6 through 10, there are illustrated exemplary methods 600, 700, 800, 900 for determining the volume of liquid in a container 10, and calibrating a container volume, using the liquid measurement system 100 described above. For example, the methods 600, 700, 800, 900 either solve the following problems or introduce the following advancements to the field of container calibration and liquid inventory reporting. The methods 600, 700, 800, 900 can help mitigate human error in entering reference starting volumes; mitigate the labor hours and risk of human error in manually entering strapping chart reference data; mitigate the labor hours resulting from daily manual calibration or volume resetting; mitigates inaccuracies related to dynamically changing container shapes; and mitigate container or liquid volume changes resulting from temperature or atmospheric changes, and/or from onboard product weight differences; and can continuously calibrate measurements in a real world environment.

Referring now to FIGS. 6 through 9, the methods 600, 700, 800, 900 describe self-calibrating methods that are performed, at least in part, by the liquid measurement system 100 described herein. In these implementations, the liquid measurement system 100 comprises a register 102, at least one fluid flow meter 106, and at least one liquid level sensor 108. In these implementations for the methods 600, 700, 800, 900, the liquid level sensor 108 measures the height (h) of the liquid in the container 10. Further, the liquid level sensor 108 transmits information, related to the calculated height (h) of the liquid level in the container 10, via an electronic signal to the register 102 of the liquid measurement system 100. In some embodiments, the liquid level sensor 108 is integrated with the register 102 of the liquid measurement system 100. The liquid level sensor 108 and the register 102 may communicate through a direct electrical connection, such as cable or wire, or wirelessly, such as through Bluetooth and Wi-Fi.

In the methods 600, 700, 800, 900, at least one flow meter 106 provides a measurement for the volume of liquid ($\Delta v$) transferred to or from the container 10. As an example, when liquid product is transferred to/from the container 10, the flow meter 106 can send information to the register 102 (e.g., or the register can pull/poll the information from the meter) related to the volume of the liquid ($\Delta v$) transferred to/from the container 10. In some embodiments, the flow meter 106 is integrated with the register 102. The register 102 receives fluid amount information from the flow meter 106 relating to the measured volume ($\Delta v$) of liquid product that is removed from/added to the container 10 by flowing through the flow meter 106. The flow meter 106 and the register 102 may communicate through a direct electrical connection, such as cable or wire, or wirelessly, such as through Bluetooth and Wi-Fi.

In summary, the methods 600, 700, 800, 900, through the liquid measurement system 100, each comprises the step of 602, 702, 802, 902 continuously (e.g., or periodically) measuring the height (h) of liquid in the container 10 using the liquid level sensor 108 and communicating the height (h) data to the register 102; and the step of 604, 704, 804, 904 continuously (e.g., or periodically) measuring the volume (v) of liquid transferred to/from the container 10 using the flow meter 106 and communicating the volume (v) data to the register 102.

As liquid is removed from the container 10, the height (h) of the liquid in the container changes. For example, when the container is full, the height (h) of the liquid level is largest (e.g., and distance from top to liquid surface is smallest) and when the container is empty, the height (h) of the liquid level is smallest (e.g., and distance from top to liquid surface is greatest). As liquid is removed or added from/to the container 10, step 606, 706, 806, 906 occurs in part as the register 102 continuously (e.g., or periodically) collects and stores data (e.g., forms data points) corresponding to the height (h) of the liquid level in the container 10, as determined by the liquid level sensor 108, and the volume of liquid (v) withdrawn from or added to the container 10, as determined by the flow meter 106, spanning the height of the container 10. In this example, increasing the number of data points collected (e.g., frequency and/or number of measurements) can increase the level of accuracy in determining the inventory (e.g., the volume of liquid) in the container 10.

The methods 600, 700, 800, 900 illustrate the step of 606, 706, 806, 906, which determines a relationship between the change in height ($\Delta h$) of the liquid level in the container 10 and the change in volume ($\Delta v$) of the liquid in the container 10 whenever liquid is removed from or added to the container 10. In this implementation, the register 102 can log each programmed height (h) point (e.g., provided by the liquid level sensor 108) along with the relative volume of liquid (v) that was changed (e.g., transferred from/to) between the current and previous height (h) measurements (e.g., provided by the flow meter 106 and level sensor 108), to profile the volume of liquid at and between each height (h) measurement for the full height of the container 10. In this manner, for example, the profile can be used to infer volumes of fluid in the container outside of measured ranges. In this implementation, a continuous or periodic (e.g., multiple readings per second) collection and recording of the relational data corresponding to height (h) and transfer volume (v) during liquid product transfer can provide a more accurate determination of the change in height ($\Delta h$) of the liquid level in the container 10 and the change in transferred volume ($\Delta v$) of the liquid in the container 10.

As an example, each time a transfer results in additional or less volume data at a certain point, a subsequent volume calibration can be made to the height-to-volume profile and the volume calibrations are combined (e.g., averaged) with previous calibrations at the height (h) and transfer volume point. In some implementations, the average may be a running average; in other implementations, a running average may not be used (e.g., a learning algorithm may continuously be available during the life of the system). As an example, the rolling average of these volume calibrations at each height point in the container 10 build a data-driven, highly accurate height-to-volume profile of the cross section of the container 10 at every discernable height point. As an example, this can result in an actual volume of liquid in the container when the calibrated strapping chart is used to identify the volume from the detected height of the liquid at a particular time.

In some implementations, a signal input from a liquid level sensor 108 can be input to an algorithm (e.g., in software 118) that determines a change in the height ($\Delta h$) of the liquid level in the container compared to known measured liquid delivered across a plurality of points of resolution (e.g., one-hundred and sixty points). In this example, the collection of these relational points, when logged, can provide a highly accurate $\Delta h$ to $\Delta v$ relationship at each height level in the container 10. As an example, these calculations can be recorded (e.g., stored in memory 116) and a rolling average can be calculated between each point to build a data driven profile of the cross section of the container 10. In this example, the result can be a continuously and automatically calibrated dimensions for the container 10 with a highly accurate gauge of the liquid inventory in the container 10. In one implementation, in one example method, a running average of a desired number of readings (e.g., up to 255) can be performed for the respective 160 points. As an example, using the running average in this example method may allow for removal of any random, large deviations that may be due to a position of a truck (e.g., on uneven ground), or other abnormalities. In another implementation, a running average may not be used, instead, the example method may continuously learn throughout the use of the system.

In another example, a method can be devised that will perform a curve fit on the collected data to an n-degree polynomial after it is determined that the tank shape is stable and well-defined. In this example, the method may be used as a solution for tanks without few random abnormal shape deviations. In this example, the end result may be a function, f(x), which will calculate the volume base on a mA reading; (e.g., tank's liquid inventory=f(mA)). In this example, the method using the function may provide a fast, consistent, and accurate inventory value. For example, this method may be used in the situation where the tank shape is stable and well-defined.

One particular advantage of this example method is that is does not require user input during calibration, as it self-calibrates. In this example, the liquid measurement system 100 can continuously monitor and update the calibration logs for subsequent fluid transfers (e.g., potentially up to 255 deliveries) thereby improving the accuracy of each container calibration each time over successive data sets across the same liquid level height range. As a result, the accuracy of the calculation of the liquid volume in the container 10 is improved with each delivery of liquid products, for example. As an example, this improved measurement accuracy can help deter theft and establish accountability for the inventory of the liquid products.

Figure 9:
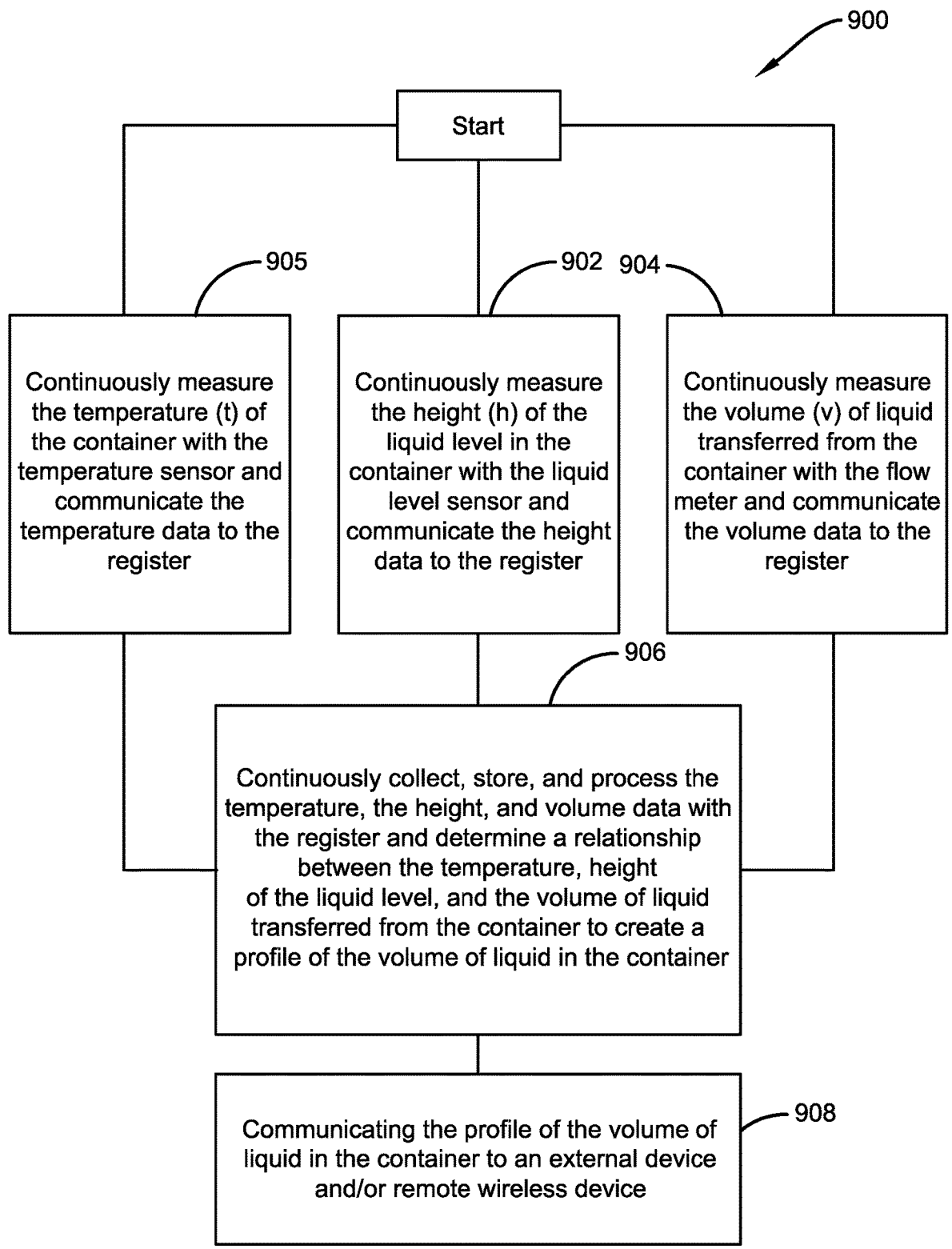
FIG. 9 is a flow chart diagram illustrating a method of creating a profile of the volume of liquid in a container based on temperature, height, and volume measurements and communicating the profile to an external device or remote wireless device using the liquid measurement system of FIG. 1.

As shown in FIGS. 9 and 10, the example methods 800, 900 may include the use of a temperature sensor 112, as illustrated in steps 805, 905. In these example, the temperature sensor 112 can identify the temperature of the liquid (e.g., or within the container 10) and provide the data to the register 102. In this example, the temperature data can be correlated with the height (h) and volume (v) data to better determine the volume of the liquid in the container 10 at certain temperature ranges reflecting seasonal weather (e.g., times of year), for example, based on fluid density and specific gravity. For example, high temperatures may cause the container 10 to deform and expand which may affect the accuracy of the calculation of the volume of the liquid within the container 10. Adding a temperature data point to the data set can improve the calibration of the method. Further, for example, the temperature of the liquid can be directly correlated to a volume of the liquid. That is, for example, temperature and/or pressure changes can change the volume of the liquid, the difference of which may be compensated for by adjusting the calculated volume using the measured temperature. As an example, function for temperature to volume adjustment for the liquid (e.g., for the various liquids that may be stored) disposed in the container can be stored in the memory of the register, and used to adjust the calculated volume presented to the user or used for calibration or transfer automation.

According to one implementation of the method 600, 700, 800, 900, when a container 10 is initially set up in the register 102 of the liquid measurement system 100, the user has the option of initializing the strapping chart using predefined shapes of the container 10. For example, the operator can choose from a list of various container shape options, such as: linear, propane, spherical, circular cylinder, elliptical cylinder, conic, and pyramid. As an example, because certain shapes, other than linear shapes, may require additional dimensions to be provided by the user, the default is for the register 102 to use a linear curve between the height of liquid in the container 10 and the volume of the container 10. In this example, this method has demonstrated an extremely fast learning curve, and the main advantage of providing the shape and dimensions of the container 10 to the register 102 is to reduce this time as the register 102 fine-tunes its strapping chart.

Figure 7:
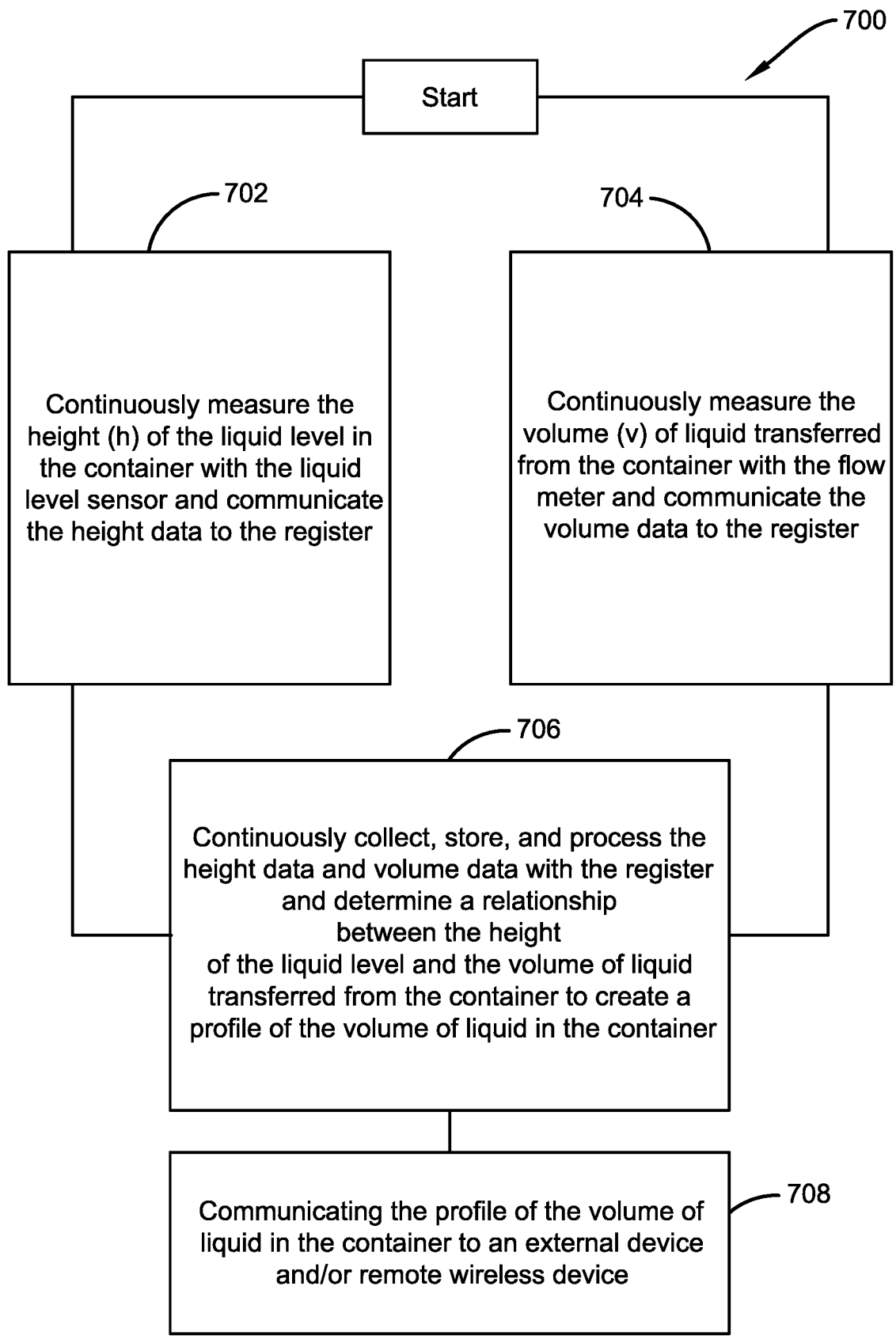
FIG. 7 is a flow chart diagram illustrating the method of creating a profile of the volume of liquid in a container based on height and volume measurements and communicating the profile to an external device or remote wireless device using the liquid measurement system of FIG. 1.
Figure 8:
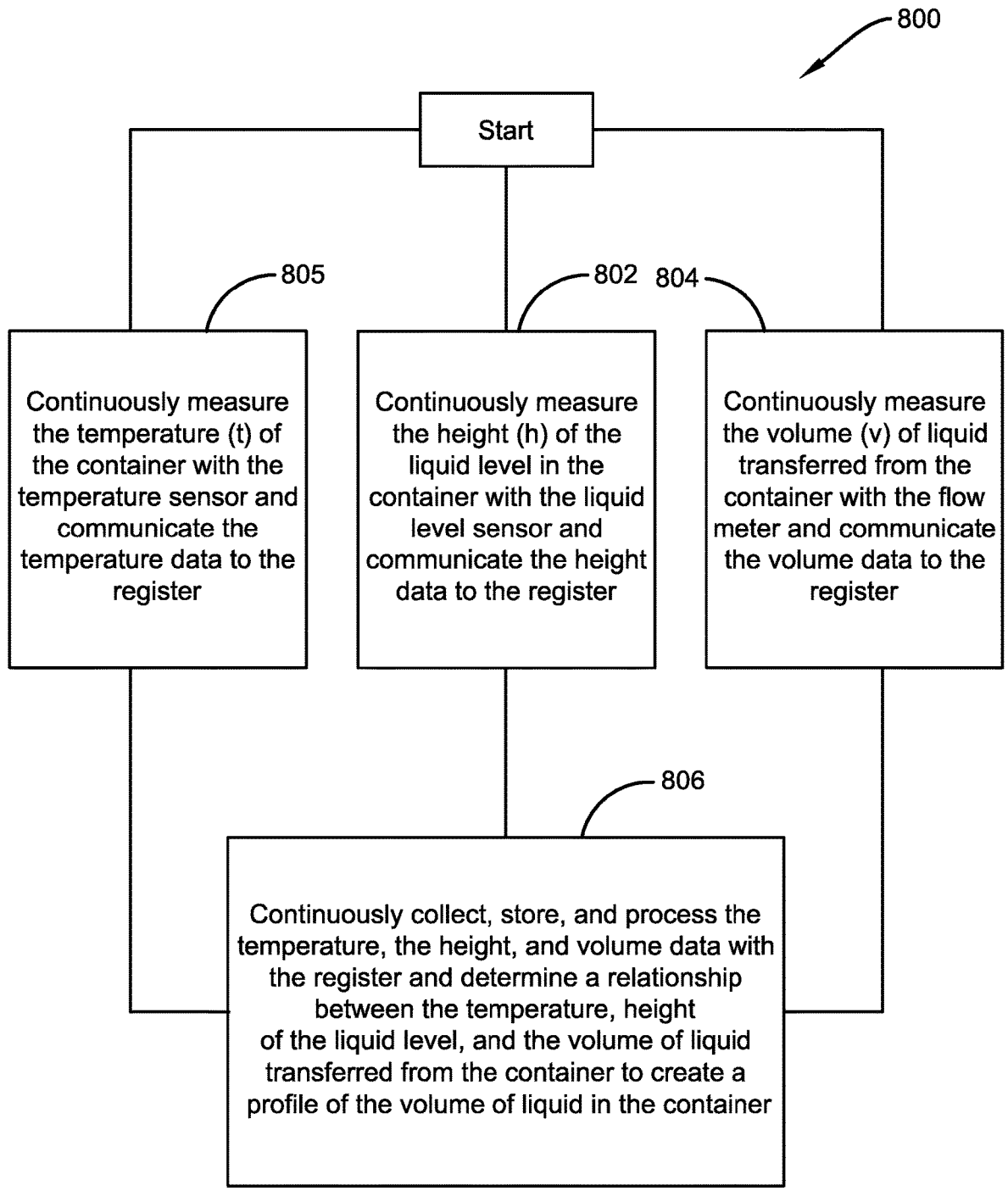
FIG. 8 is a flow chart diagram illustrating a method of creating a profile of the volume of liquid in a container based on temperature, height, and volume measurements using the liquid measurement system of FIG. 1.

Further, the methods 700, 900 also provide many options for communicating the volume of liquid in the container 10 to the user. For example, the liquid measurement system 100 may include a user interface 104, such as an HMI, which visually displays liquid inventories (e.g., amongst other things) contained in one or more containers, as shown in FIG. 10. Moreover, in some implementations, the liquid measurement system 100 may send liquid inventory data 708, 908 from one or more containers 10 to external devices and/or remote wireless devices such as computers, printers, and cell phones, remote servers, etc., as shown in FIGS. 7 and 9.

Additionally, for example, the methods 600, 700, 800, 900 may also include a process for providing a user with status updates and alarms. As described above, the liquid measurement system 100 includes programmable software 118, which may permit the user to set notifications upon the occurrence of a user-defined event or condition. For example, the liquid measurement system 100 may be programmed to alert a user when the volume of liquid in the container 10 reaches a predetermined level. Additionally, for example, the liquid measurement system 100 may be programed to pause or stop a delivery of liquid when the volume of liquid in the container reaches a predetermined level. The methods 600, 700, 800, 900 may also provide for activating warning lights and/or an audible alarm upon the occurrence of a user-defined condition and, the method may send a notification message to external devices or remote wireless devices reporting the presence of the condition. Additionally, the method can report certain predetermined errors in the liquid measurement system 100 to the user and owner.

In some implementations, the liquid measurement system 100 and methods 600, 700, 800, 900 can offer several advantages. As an example, the end deliverable fluid transfer system can comprise a continuously and automatically calibrated container inventory system with highly accurate container inventory reporting. For example, it may allow the industry to incorporate highly accurate container level and inventory reporting into their operations without the burden of complex additional hardware investment. User may have the benefit of using a register 102 while utilizing a conventional, lower cost sensor 108 integrated into the register 102 which provides higher levels of inventory accuracy to their customers, for example.

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A method for determining the volume of liquid in a container comprising:
   measuring a volume of liquid flowing through a flow meter at a plurality of data intervals;
   using a liquid level sensor to measure the height of a liquid inside the container at the plurality of data intervals;
   creating a profile of the container at and between the plurality of data intervals based at least on the relationship between the measurement of the volume of liquid flowing through a flow meter at the plurality of data intervals and the measurement of the height of a liquid inside the container at the plurality of data intervals; and determining the volume of liquid in the container based at least on the created profile of the container.

2. The method of claim 1, the measuring the volume of liquid flowing through the flow meter at the plurality of data intervals comprising one of:
measuring continuously during a fluid transfer event; and
measuring periodically at a predetermined rate during a fluid transfer event.

3. The method of claim 1, the measuring of the volume performed by one of:
a mass flow meter;
a positive displacement flow meter; and
a turbine flow meter.

4. The method of claim 1, the liquid level sensor measuring the height of liquid inside the container at the plurality of data intervals comprising performing one of:
measuring the height continuously; and
measuring the height periodically at a predetermined rate.

5. The method of claim 1, the liquid level sensor comprising at least one of:
a float gauge;
an ultrasonic detector;
a radar detector;
a laser detector; and
a weight detector.

6. The method of claim 1, comprising measuring a temperature of the liquid in the container using a temperature sensor.

7. The method of claim 6, wherein the determining of the volume of liquid in the container comprises determining the volume of liquid in the container based at least on the relationship between the measurement of the volume of liquid determined by the flow meter and the measurement of the height of a liquid inside the container determined by the liquid level sensor and the temperature of the liquid in the container determined by the temperature sensor.

8. The method of claim 7, comprising adjusting a calculated volume of the liquid based at least on the temperature of the liquid in the container and/or the temperature of the inside of the container.

9. The method of claim 1, comprising selecting a container shape for the container, and using a strapping chart that correlates to the container shape and a known container volume to determine an actual volume of liquid based on the measured height of the liquid.

10. The method of claim 9, comprising using the measured volume from the flow meter to calibrate the selected strapping chart resulting in a calibrated strapping chart for the container, the calibrated strapping chart providing a calibrated actual volume of the liquid in the container based on the measured height of the liquid.

11. The method of claim 10, comprising continuously or periodically calibrating the calibrated strapping chart using the measured volume from the flow meter from a plurality of fluid transfer events.

12. The method of claim 10, comprising:
identifying a first measured volume of fluid from the flow meter between a first set of at least two of the plurality of data intervals;
identifying a first measured height and a second measured height of the liquid in the container corresponding to the at least two of the plurality of data intervals; and
adjusting the selected strapping chart to reflect the actual volume of the liquid in the container resulting in the calibrated strapping chart based at least on the first measured volume of fluid.

13. A liquid level system for determining the volume of liquid in a container comprising:
a flow meter that measures a volume of liquid flowing into or out of the container at a plurality of data intervals during a fluid transfer event;
a liquid level sensor that measures a height of a liquid in the container at the plurality of data intervals; and
a register in communication with the flow meter and the liquid level sensor, the register collecting data from the flow meter indicative of the volume of liquid flowing into or out of the container, and from the liquid level sensor indicative of height of a liquid in the container to determine the volume of liquid in a container based on the relationship between the measured volume of liquid flowing into or out of the container and the measured height of a liquid in the container at the plurality of data intervals.

14. The system of claim 13, the flow meter measuring fluid flow during a fluid transfer event either continuously or periodically at a predetermined rate at the plurality of data intervals, and the flow meter comprising one of:
a mass flow meter;
a positive displacement flow meter; and
a turbine flow meter.

15. The system of claim 13, the liquid level sensor measuring the height of liquid inside the container at the plurality of data intervals comprising continuously measuring or periodically measuring at a predetermined rate at the plurality of data intervals, and the level sensor comprising one of:
a float gauge;
an ultrasonic detector;
a radar detector;
a laser detector; and
a weight detector.

16. The system of claim 13, comprising a temperature sensor communicatively coupled with the register, the temperature sensor detecting the temperature of the liquid in the container, and/or the temperature inside the container, wherein the register combines the detected temperature with the measured volume from the flow meter and the measure height of liquid from the liquid level sensor to determine the volume of liquid in the container.

17. The system of claim 13, the register comprising:
memory that operably stores strapping chart data, and stores programming that determines the volume of liquid in the container based at least on the strapping chart data and the measured flow volume and measured liquid height; and
a processor that is operably used to process received data and the programming to determine the volume of liquid in the container.

18. The system of claim 13, the register comprising a user interface that operably displays information identifying the volume of the liquid in the container, provides for user selection of a container type, shape, and/or volume, and/or displays flow volume.

19. The system of claim 13, comprising a strapping chart calibration component that operably updates an initial strapping chart to a calibrated strapping chart based on the measured flow volume and the measured liquid height, resulting in determination of an actual volume of liquid in the container.

20. A system for accurately measuring a volume of liquid in a container using an automatically calibrated strapping chart based at least on a base strapping chart, identified flow volume during fluid transfer events, and identified liquid height inside the container during the fluid transfer events, the system comprising:
- a fluid flow meter that measures a volume of fluid transferred at a plurality of data intervals during a fluid transfer event;
- a liquid level sensor that measures a height of the liquid at the plurality of data intervals and at the start and end of the fluid transfer event; and
- a register that is communicatively coupled with the fluid flow meter and the liquid level sensor to receive the measured fluid volume and the measured liquid height, the register comparing the measured fluid volume from a plurality of fluid transfer events with expected volumes from the base strapping chart based at least on the measured liquid height from the plurality of fluid transfer events, to determine a calibrated strapping chart that identifies an actual volume of the fluid in the container, wherein the register continuously updates the calibrated strapping chart based on the measured fluid volume during subsequent fluid transfer events.

* * * * *